United States Patent [19]
Chen

[11] Patent Number: 5,257,727
[45] Date of Patent: Nov. 2, 1993

[54] LUGGAGE CARRIER FOR BICYCLES

[76] Inventor: Ming Y. Chen, No. 7, Fu Kong Rd., Fu Hsin Industrial Area, Fu Hsin Hsiang, Chang Hua Hsien, Taiwan

[21] Appl. No.: 904,672

[22] Filed: Jun. 26, 1992

[51] Int. Cl.$^5$ .............................................. B62J 7/04
[52] U.S. Cl. .................................... 224/39; 224/30 R
[58] Field of Search ...................... 224/39, 32 A, 32 R, 224/30 R

[56] References Cited

U.S. PATENT DOCUMENTS

| | | | |
|---|---|---|---|
| 4,383,625 | 5/1983 | Kiang | 224/30 R |
| 4,410,116 | 10/1983 | Mattei | 224/40 |
| 4,429,818 | 2/1984 | Patterson et al. | 224/39 |

Primary Examiner—Linda J. Sholl
Attorney, Agent, or Firm—Bacon & Thomas

[57] ABSTRACT

A luggage carrier for bicycle having two parallel tracks on the front in longitudinal direction connected to the seat tube by two foldable connections and a clamp and the seat stays by a link, two channel plates on two opposite bottom frames thereof adjustably connected to the axle of the free-wheel hub by two elongated bottom adjustment plates, and two fasteners respectively fastened to the channel plates on the outside for tying up tie ropes in securing the load. By changing the positions of the foldable connections and the link on the tracks, the position of the luggage-carrier on the bicycle is adjusted horizontally. By changing the positions of the elongated bottom adjustment plates on the channel plates, the position of the luggage-carrier on the bicycle is adjusted vertically.

1 Claim, 4 Drawing Sheets

LUGGAGE CARRIER FOR BICYCLES

BACKGROUND OF THE INVENTION

The present invention relates to a luggage carrier for bicycles and relates more particularly to an adjustable luggage carrier which can be conveniently fastened to any of a variety of bicycles for carrying things stably.

A bicycle generally has a luggage-carrier fastened to the seat tube or seat stays and the axle of the free-wheel hub over the rear wheel for carrying things. FIGS. 1 and 2 illustrate a luggage-carrier according to the prior art. This luggage-carrier has a front block with holes adjustably connected to the seat stays adjacent to the seat tube by two elongated connecting plates and a link, two bottom blocks with holes respectively connected to either end of the axle of the free-wheel hub by two eye end rods. The eye end rods have each an eye end connected to either end of the axle of the free-wheel hub and an opposite end inserted through a hole on either bottom block and adjustably secured in place by a respective tightening up screw. This structure of luggage-carrier can be adjusted horizontally as well as vertically according to the frame structure of the bicycle to be fastened. However, the connections of the bottom blocks with the eye end rods are not very strong for supporting a heavy load. Therefore, this structure of luggage-carrier may oscillate on the bicycle, more particularly after a long use.

SUMMARY OF THE INVENTION

The present invention eliminates the aforesaid problem. It is therefore an object of the present invention to provide a luggage-carrier which is stable in use on a bicycle. It is another object of the present invention to provide a luggage-carrier which can be conveniently adjusted horizontally as well as vertically for fastening to any of a variety of bicycles. According to the preferred embodiment, the luggage-carrier is comprised of a horizontal base having two parallel tracks on the front in longitudinal direction connected to the seat tube by two foldable connections and a clamp and the seat stays by a link, two channel plates on two opposite bottom frames thereof adjustably connected to the axle of the free-wheel hub by two elongated bottom adjustment plates, and two fasteners respectively fastened to the channel plates on the outside for tying up tie ropes in securing the load. The bottom adjustment plates have each a line of bolt holes at different heights alternatively connected to two through holes on either channel plate by screws which stop the channel plates in place even when a heavy load is carried on the horizontal base. By changing the positions of the foldable connections and the link on the tracks, the position of the luggage-carrier on the bicycle is adjusted horizontally. By changing the positions of the elongated bottom adjustment plates on the channel plates, the position of the luggage-carrier on the bicycle is adjusted vertically.

DETAILED DESCRIPTION OF THE PREFERRED EMBODIMENT

Figure 1:
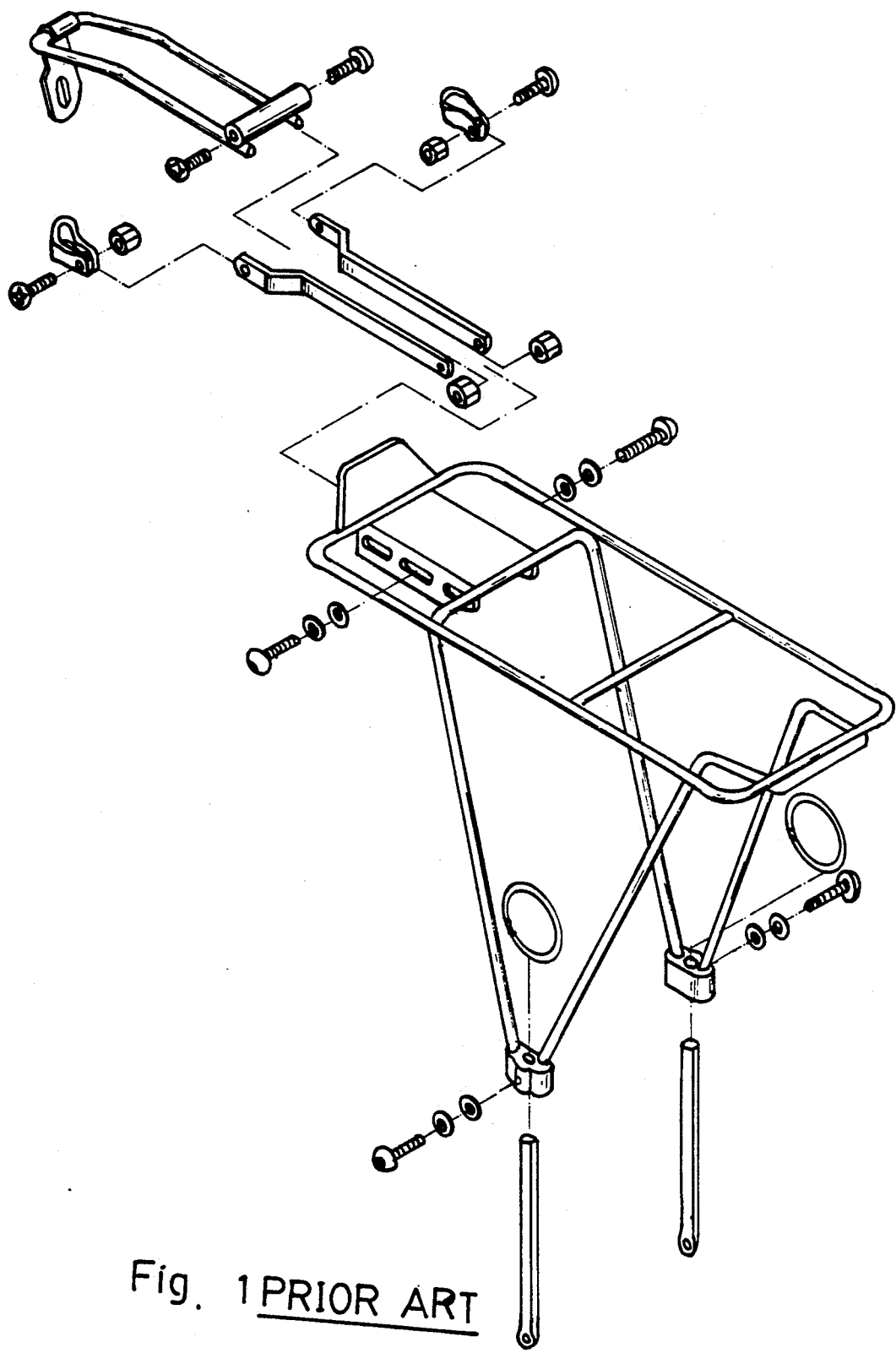
FIG. 1 is an exploded view of a prior art luggage carrier.
Figure 2:
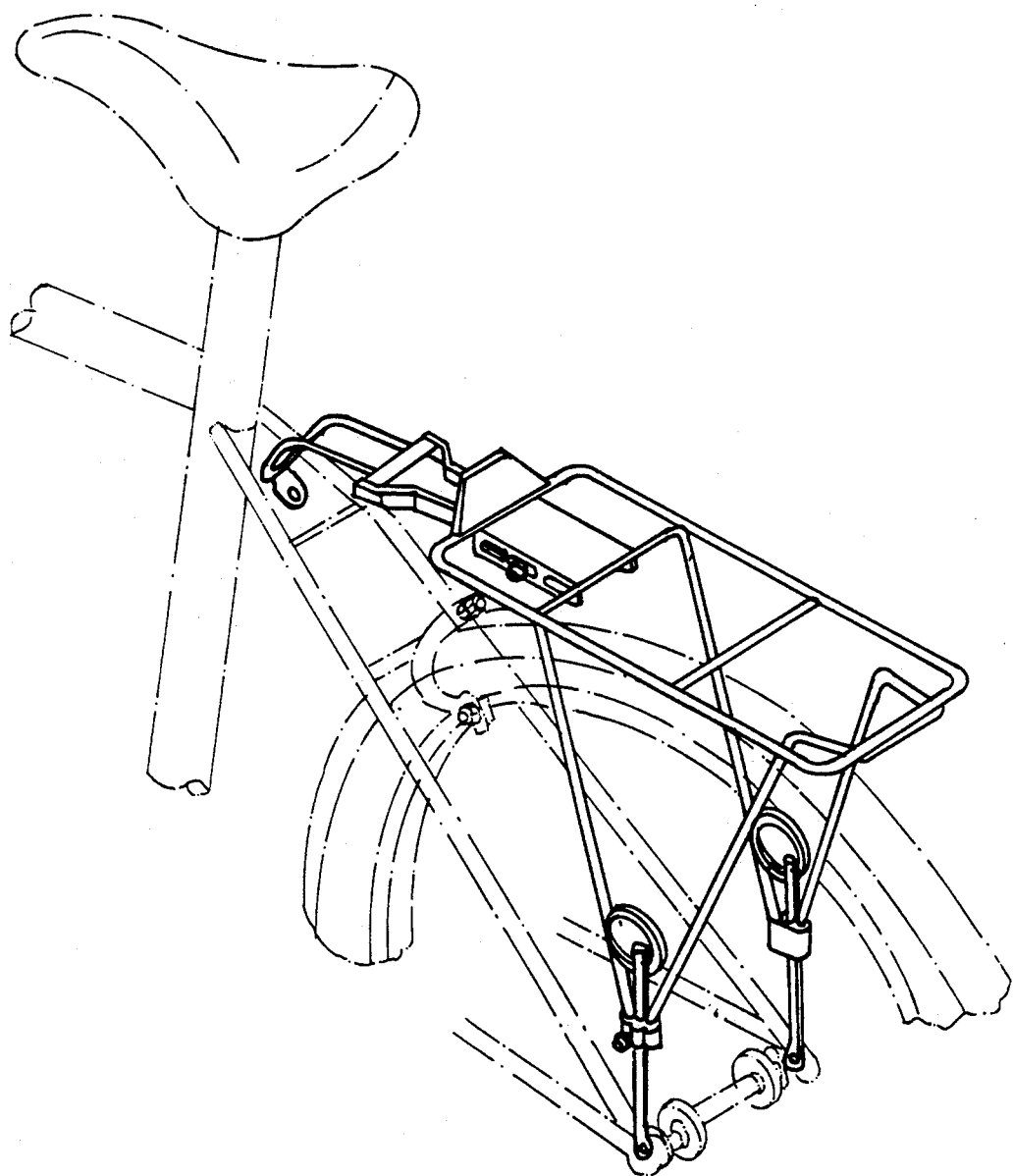
FIG. 2 is an installed view of the prior art luggage carrier of FIG. 1 on a bicycle frame.
Figure 3:
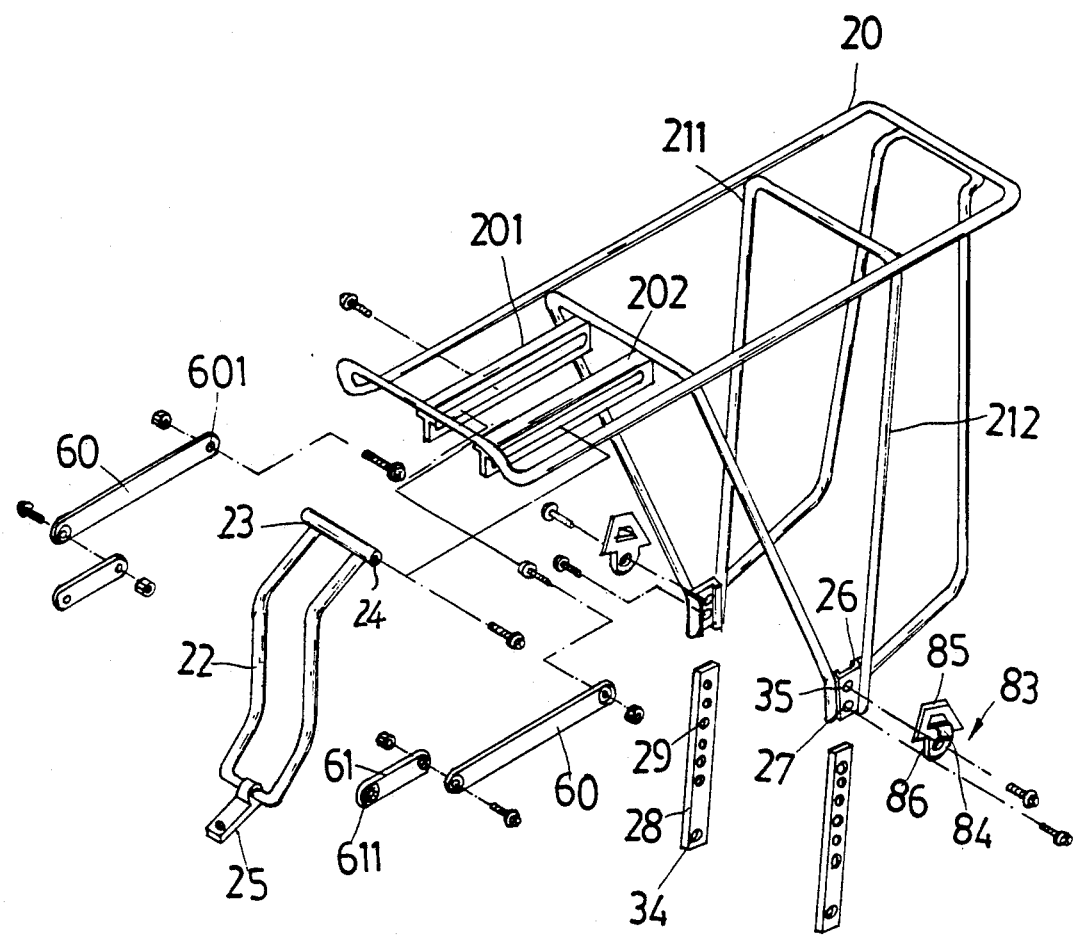
FIG. 3 is an exploded view of a luggage carrier embodying the present invention.
Figure 4:
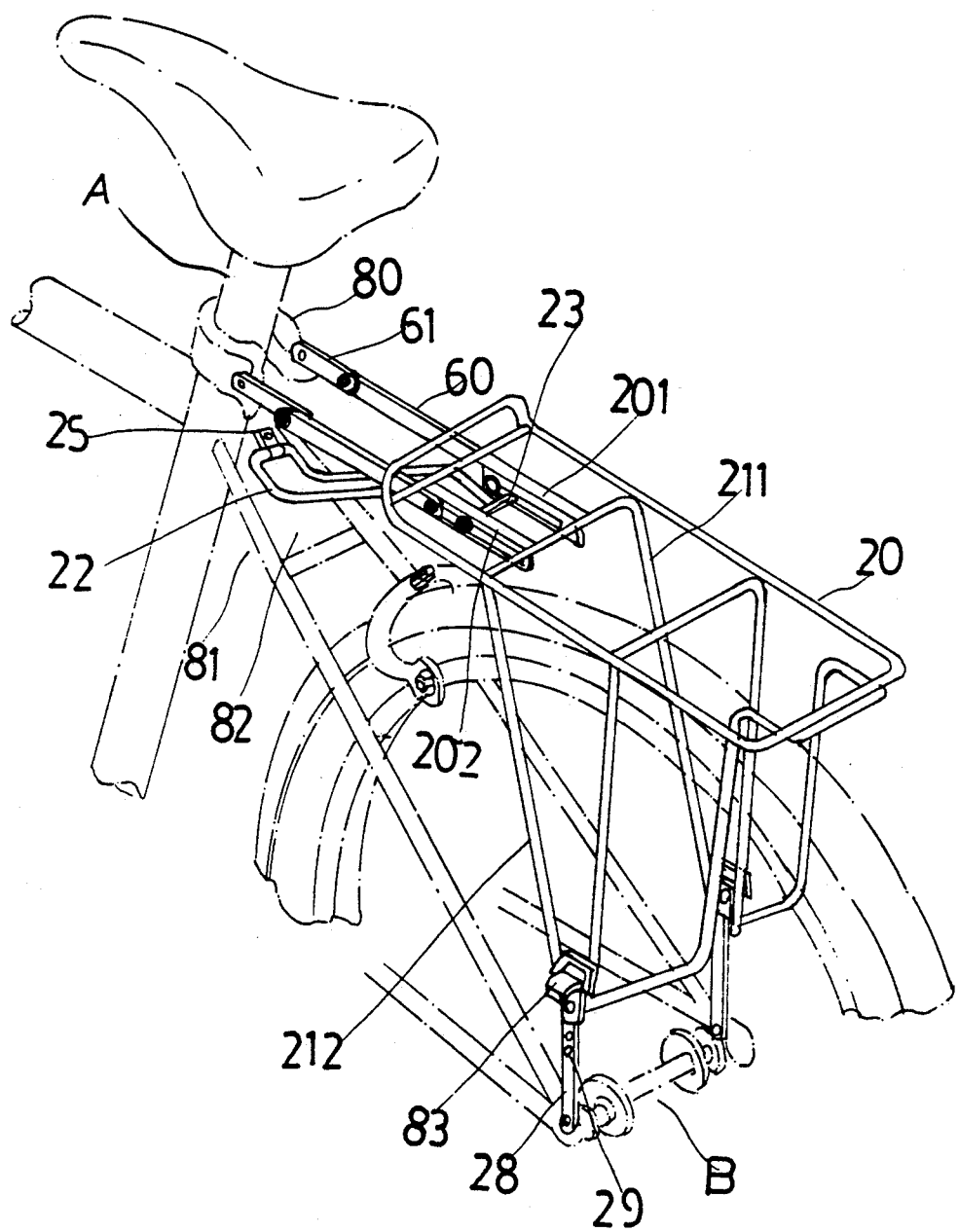
FIG. 4 is an installed view of the luggage carrier of FIG. 3 on a bicycle frame.

Referring to FIGS. 3 and 4, a luggage carrier as constructed in accordance with the present invention is generally comprised of a base 20 having two opposite bottom frames 211,212 on two opposite sides at right angles and two parallel tracks 201 on the front end thereof in longitudinal direction, two long connections 60 and two short connections 61 for connecting the two parallel tracks 201 to the seat tube A by a clamp 80, a link 22 for connecting the two parallel tracks 201 to the rear brake mounting frame 82 on the upper part of the seat stays 81, two channel plates 26 respectively welded to the bottom frames 211,212 on the bottom, two elongated bottom adjustment plates 28 for connecting the channel plates 26 to the axle of the free-wheel hub B on two opposite ends, and two fasteners 83 respectively fastened to the channel plates 26 on the outside for fastening tie ropes or elastic bands in holding things on the base 20.

Referring to FIGS. 3 and 4 again, the two parallel tracks 201 have each an elongated slot 202 in longitudinal direction for connecting the long connections 60 by screws and locknuts. The long and short connections 60,61 have each two pivot holes 601 or 611 on two opposite ends for inserting screws. The long connections 60 have each one end pivotably connected to either track 201 by a screw and locknut, and an opposite end pivotably connected to either end of either short connection 61 by a screw and locknut. The short connections 61 have each an opposite end pivotably connected to either end of the clamp 80 which is hung on the seat tube A. The link 22 has a cross bar 23 on end which has two bolt holes 24 on two opposite ends respectively inserted through the elongated slot 202 on either track 201 behind the long connections 60 and secured in place by screws, and a connecting plate 25 on an opposite end fastened to the rear brake mounting frame 82 on the upper part of the seat stays 81 by a screw. The channel plates 26 have each two through holes 27,35 for connecting either fastener 83 and either elongated bottom adjustment plate 28. The two elongated bottom adjustment plates 28 fit into the channel plates 26 on the inside respectively, having each a row of bolt holes 29 alternatively connected to the two through holes 27,35 on either channel plate 28 by screws and nuts and a through hole 34 adjacent to the bottom edge thereof connected to either end of the axle of the free-wheel hub B by a locknut. The fasteners 83 have each a loop 85 on one end for inserting a tie rope or the like, a hook 84 on the middle for fastening a tie rope or the like, and a ring 86 on an opposite end connected to the upper through hole 35 on the respective channel plate 26 by a screw and a locknut.

Referring to FIG. 4 again, by changing the positions of the long connections 60 and the cross bar 23 of the link 22 on the elongated slot 202 of each track 201, the position of the luggage-carrier on the bicycle is horizontally adjusted. By changing the positions of the channel plates 26 on the elongated bottom adjustment plates 28, the level position of the luggage-carrier is adjusted. Furthermore, the luggage carrier does not vibrate while carrying things because it is supported on the axle of the free-wheel hub B by the elongated bottom adjustment plates 28, on the seat stays 81 by the link 22, and on the seat tube A by the long and short connections 60,61 and the clamp 80.

I claim:

1. A luggage carrier for a bicycle comprising:

a base having two parallel tracks on a front end thereof in longitudinal direction and two channel plates on two opposite bottom frames thereof, said tracks having each an elongated slot in longitudinal direction, said channel plates having each two through holes at different heights;

two long connections having each a first pivot hole on one end pivotably respectively connected to the elongated slot on either track, and a second pivot hole on an opposite end;

two short connections having each a first pivot hole pivotably respectively connected to the second pivot hole on either long connection, and a second pivot hole for connection to a bicycle's seat tube by a clamp;

a link for connecting said tracks to a bicycle's seat stays, said link having a cross bar on an end horizontally inserted through the elongated slot on each track and secured behind said long connections by screw means and a connecting plate on an opposite end fastened to a bicycle's seat stays;

two elongated bottom adjustment plates respectively longitudinally fitted into said channel plates and secured in place by screw means for connecting said channel plates to the axle of a bicycle's free-wheel hub, said elongated bottom adjustment plates having each a row of bolt holes aligned in longitudinal direction and alternatively connected to the two through holes on either channel plate on the inside and a through hole adjacent to a respective bottom edge for connecting to either end of the axle of a bicycle's free-wheel hub; and two fasteners respectively fastened to said channel plates on the outside, said fasteners having each a loop on one end for inserting a tie rope or band, a hook on the middle for tying a tie rope or band, and a ring on an opposite end respectively fastened to either through hole on either channel plate by screw means.

* * * * *